No. 814,618. PATENTED MAR. 6, 1906.
C. A. MORRIS.
DREDGING BUCKET.
APPLICATION FILED OCT. 27, 1905.

5 SHEETS—SHEET 1.

WITNESSES:
Robert Head
R. B. Cavanagh

INVENTOR
Charles A. Morris
BY
Clifford B. Pull
ATTORNEYS

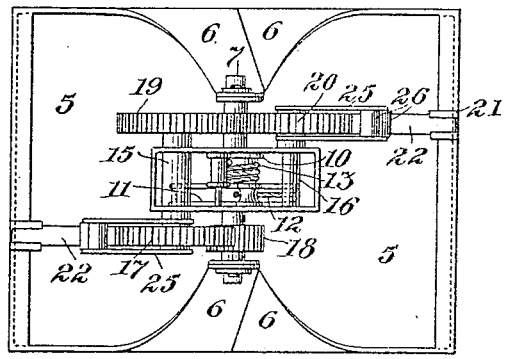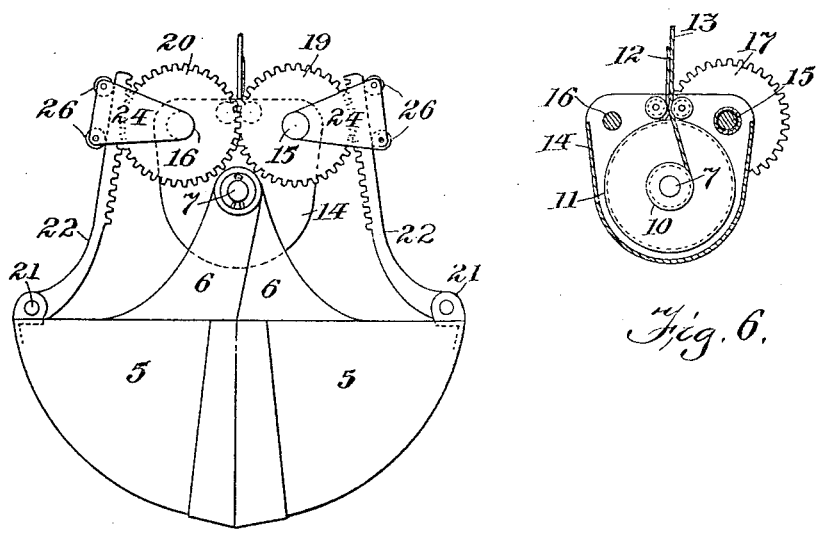

No. 814,618. PATENTED MAR. 6, 1906.
C. A. MORRIS.
DREDGING BUCKET.
APPLICATION FILED OCT. 27, 1905.

5 SHEETS—SHEET 3.

No. 814,618. PATENTED MAR. 6, 1906.
C. A. MORRIS.
DREDGING BUCKET.
APPLICATION FILED OCT. 27, 1905.

5 SHEETS—SHEET 4.

WITNESSES:
Robert Head
R. B. Cavanagh

INVENTOR
Charles A. Morris
BY
Gifford & Bull
ATTORNEYS

No. 814,618.   PATENTED MAR. 6, 1906.
C. A. MORRIS.
DREDGING BUCKET.
APPLICATION FILED OCT. 27, 1905.

5 SHEETS—SHEET 5.

WITNESSES:

INVENTOR
Charles A. Morris
BY
ATTORNEYS

UNITED STATES PATENT OFFICE.

CHARLES A. MORRIS, OF BLOOMFIELD, NEW JERSEY, ASSIGNOR TO HAYWARD COMPANY, OF NEW YORK, N. Y., A CORPORATION OF NEW YORK.

DREDGING-BUCKET.

No. 814,618.  Specification of Letters Patent.  Patented March 6, 1906.

Application filed October 27, 1905. Serial No. 284,612.

*To all whom it may concern:*

Be it known that I, CHARLES A. MORRIS, a citizen of the United States, and a resident of Bloomfield, in the county of Essex and State of New Jerseey, have invented certain new and useful Improvements in Dredging-Buckets, of which the following is a specification.

This invention relates to improvements in dredging-buckets, and has particular application to types of buckets commonly known as the "clam-shell" or "orange-peel" buckets.

My invention consists in the construction, combination, and arrangement of parts set forth in and falling within the scope of the appended claims, and while I have herein shown and described certain preferred forms of the invention I wish it to be understood that I do not limit myself to the precise details set forth, as there may be modification and variation in the construction and arrangement of parts without departing from the spirit of the invention or exceeding the scope of the claims.

In the accompanying drawings like characters of reference indicate like parts in all the views.

Figure 1:
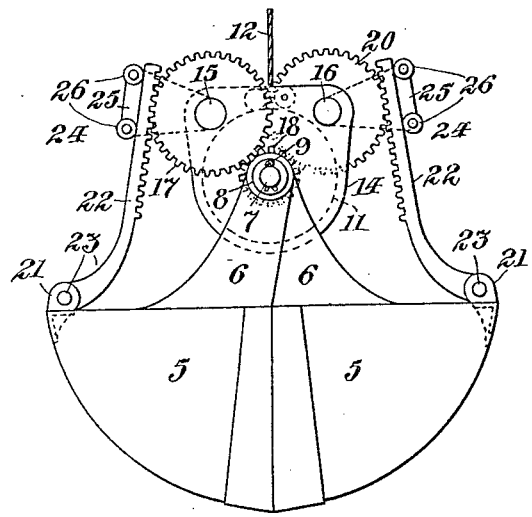
Figure 2:
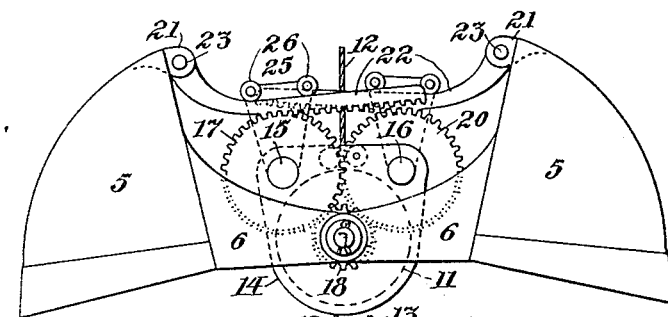
Figure 3:
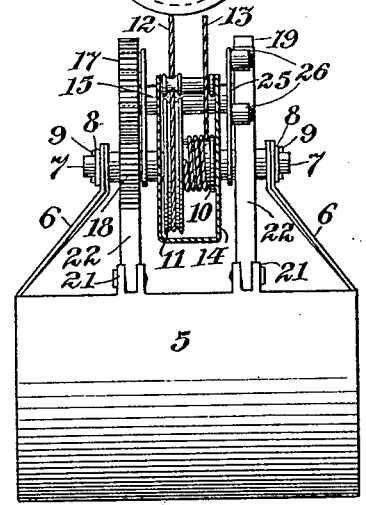
Figure 7:
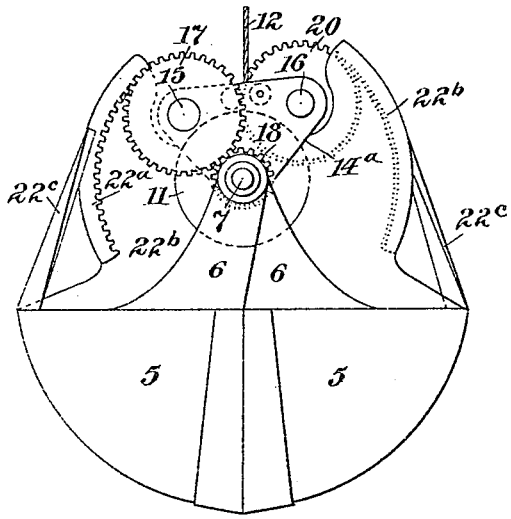
Figure 8:
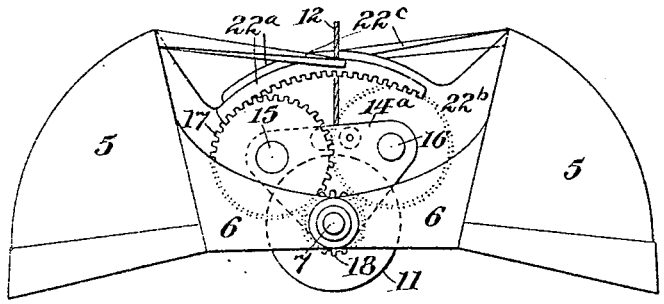
Figure 9:
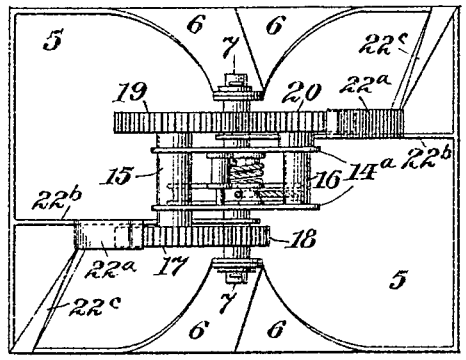
Figure 10:
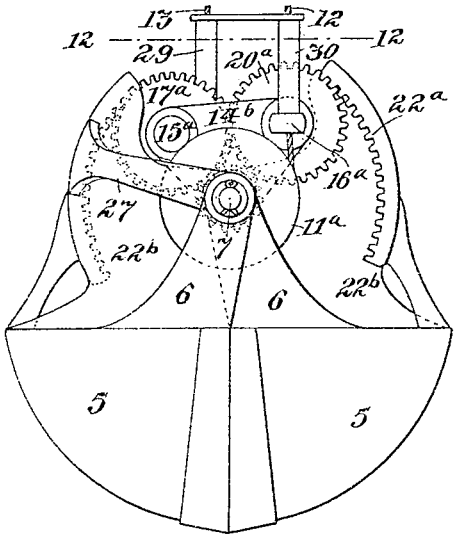
Figure 11:
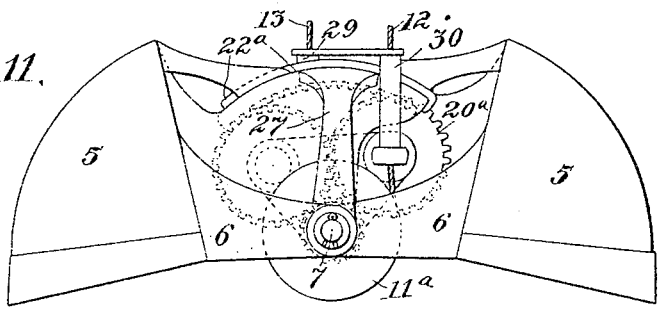
Figure 12:
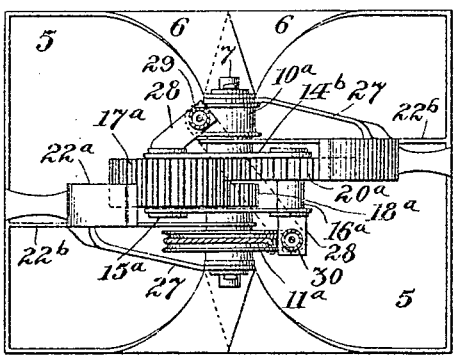
Figure 13:
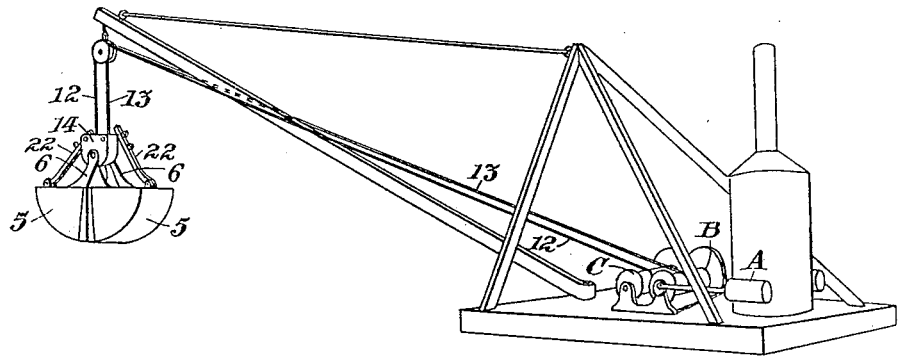

Figure 1 is a view, partly in elevation and partly in section, of a closed bucket embodying my improvements. Fig. 2 is a view showing the bucket in open position. Fig. 3 is a view in end elevation of the bucket shown in Figs. 1 and 2. Fig. 4 is a top view of the same. Fig. 5 is a view in side elevation. Fig. 6 is a detail view of the portions of the shaft-operating mechanism. Fig. 7 is a view in side elevation of a modified form of bucket. Fig. 8 shows such bucket in open position. Fig. 9 is a top view of the same. Fig. 10 is a view in side elevation of still another form of bucket. Fig. 11 is a view showing a bucket such as shown in Fig. 10 in its open position ready to receive a load. Fig. 12 is a top view of a bucket shown in Figs. 10 and 11. Fig. 13 is a view embodying a conventional illustration of a hoisting-engine and showing the connections between said engine and the bucket, this view being intended to illustrate one manner of operating such bucket.

Referring now to the accompanying drawings in detail, and particularly to Figs. 1 to 6, inclusive, the numerals 5 5 indicate the two sections of a bucket, each section having a pair of oppositely-arranged inwardly-inclined side arms or brackets 6 6, all of said arms being connected by the power-shaft 7 of the bucket passing through the ends of said arms, said shaft being maintained in position by washers 8 8 and cotter-pins 9 9, the construction being such that the two sections of the bucket are connected by a common pivot, whereby such sections may be opened and closed. Rigidly secured upon the shaft at approximately the central portion thereof and adapted to turn therewith are two rope-drums 10 and 11, the drum 11 being preferably greater in diameter than the drum 10, so that more rope will be wound on this drum in one revolution of the shaft than is wound on the drum 10. The numeral 12 indicates a line for hoisting and closing the bucket, but shall be hereinafter for the sake of convenience termed the "closing-line," such line being secured to the drum 11, while 13 indicates the opening-line of the bucket, connected at one end to the drum 10. Both of these lines lead off to a suitable source of power, such as the drums of a hoisting-engine, conventionally illustrated in Fig. 13, said engine, which is shown at A, having drums B and C, respectively. The line 12 passes to the drum C, while the line 13 passes to and is operated by the drum B. These two drums are operated in a well-known manner and the engine may be of any preferred type.

In order to impart movement from the power-shaft 7 to the bucket-sections to operate the latter to open and close, I may employ the following arrangement of parts and mechanisms: In Figs. 1 to 6 the numeral 14 designates a casing or boxing supported from the shaft 7. Extending transversely through the casing and journaled therein are the stud-shafts 15 and 16, the shaft 15 carrying a gear-wheel 17, turned at the pinion 18 on the power-shaft 7. The revolution of the gear-wheel 17, which is fast with the stud-shaft 15, of course turns the latter, which also carries a gear-wheel 19, meshing in turn with the gear-wheel 20 on the end of the shaft 16. On each of the sections 5 5 of the bucket are formed lugs or perforated ears 21 21, and to each pair of ears there is secured one end of a rack-bar 22 by means of a pivot 23. One of said rack-bars is intended to engage with the gear-wheel 17, while the rack on the opposite section engages with the gear-wheel 20.

To hold these rack-bars in proper condition in contact with their respective gears, I may employ guides 24, and as each of said guides is a counterpart of the other a description of one is sufficient for both. 25 is a plate, in the present instance triangular in form, secured to the shaft of the gear, for the rack of which gear it is intended to act as a guide. This triangular plate extends beyond the periphery of the adjacent gear-wheel and carries guide-rollers 26 26, adapted to bear against the back or the non-serrated portion of the rack to guide the latter.

The above is a description of the mechanical construction of my bucket, such as shown in Figs. 1 to 6, inclusive, and I will now proceed to describe briefly the operation of the same. When empty and suspended in a non-working position, the bucket is normally closed. Now if it be desired to open the bucket and lower the same to receive a load the drum to which the opening-line is secured is actuated and the pull on the line revolves the power-shaft 7 in a direction to open a section of the said bucket in the position shown in Fig. 2. The bucket is then ready to be lowered, and this is accomplished by paying out the hoisting-line, the opening-line being also paid out sufficiently to restrain the sections of the bucket from closing. The bucket is then lowered into the material and closed by taking in the hoisting-line of the engine-drum, which tends to pull the sections together by revolving the shaft in the direction opposite to which it is revolved by the opening-line. As soon as the bucket is closed the two lines are then taken in by the engine-drums, sufficient tension being maintained on the hoisting-line to prevent any pull of the opening-line from opening the bucket. When the bucket has reached the point where the material is to be deposited, the taking in of the hoisting-line is stopped and the pull is continued on the opening-line, which tends to operate the shaft to open the bucket.

In Figs. 7, 8, and 9 I have shown a modification of my bucket, which I will now proceed to describe. The sections 5 5 are provided with arms 6 6, and the shaft 7, as described, for the bucket embodied in Figs. 1 to 6, and the operating mechanism of the bucket in so far as concerns the drums and gear-wheel, is similar to the bucket heretofore described; but instead of employing the pivoted rack-bars I provide the bucket shown in Figs. 7, 8, and 9 with a segmental rack $22^a$, formed on and preferably integral with a web $22^b$, which web extends down into the bucket-section and has one end $23^b$ apertured to permit the passage of the power-shaft 7. A brace, such as $22^c$, extends from one corner of the bucket to the rack portion of the web and tends to strengthen and add to the durability of the bucket. Instead of employing a casing or boxing for the gear-wheels for the shaft and drums 10 and 11, as is shown in Figs. 1 to 6, inclusive, I provide a plurality of bearing-plates $14^a$, spaced apart by and supporting the gear-shafts 15 and 16. The operation of this bucket is substantially the same as that heretofore described in Figs. 1 to 6.

In Figs. 10, 11, and 12 I have shown still another modification of my device. In this case the sections 5 5 are provided with segmental racks carried by the webs the same as in Figs. 7, 8, and 9, with the additional feature that such webs are provided with braces 27, extending diagonally from the segmental rack portion of the web to the power-shaft 7, said braces having apertures to permit the passage of said shaft. In the case of this bucket the drums $10^a$ and $11^a$ are arranged near the ends of the shaft, with the operating-gearing interposed therebetween. This gearing comprises a pinion $18^a$, meshing with the gear-wheel $17^a$, which is relatively wider than said gear $18^a$, and also in turn meshes with the gear $20^a$, carried by the shaft $16^a$. A short stud-shaft $15^a$ supports the relatively wide gear-wheel $17^a$. The supporting-frame for the gears in this instance is also formed of two triangular plates spaced apart, said plates being indicated at $14^b$ $14^b$. Extending from the sides of said plates $14^b$ $14^b$ are projections 28 28, each carrying a vertically tubular guide 29 and 30, arranged adjacent to the drums $10^a$ and $11^a$, respectively, so that the hoisting and opening ropes may pass therethrough to the drums, such arms having a tendency to guide the rope and maintain it in its proper position and also avoid such rope becoming entangled with any of the operating mechanism of the bucket. The operation of this bucket is substantially the same as that heretofore described for the two preceding forms, and it is unnecessary to reiterate the same in detail.

Having thus described my invention, what I claim as new, and desire to secure by Letters Patent, is—

1. A sectional bucket provided with a power-shaft uniting the sections, a rack carried by each of said sections, and gears operated from the shaft coöperating with said rack to actuate the sections.

2. A bucket comprising sections pivoted upon a power-shaft to which said sections are pivoted, and mechanism for actuating said sections comprising drums fast on said shaft, a rope connected with each of said drums to impart power through the drum to the shaft, and means operated from said shaft for moving the sections around said pivot.

3. A bucket comprising a plurality of sections, a power-shaft connecting said sections, drums upon said power-shaft, an opening-rope and a hoisting-rope connected to the drums and adapted to operate said drums to actuate the shaft, a train of gears operatively connected to the shaft and actuated thereby, and racks secured to the sections and operated from said gears.

4. A bucket comprising a plurality of sections, a power-shaft connecting said sections, a plurality of ropes or lines for turning said shaft in opposite directions, a bearing supported from said shaft, a train of gears carried by said bearing, and rack mechanism connected to the bucket-section and designed to be actuated by the motion of said gear-wheel the power-shaft is operated by the ropes.

5. A bucket comprising a plurality of sections, a power-shaft connecting the same, gears actuated from said power-shaft, means meshing with said gears and connected to the bucket-sections, guide members for said gear-meshing means, and means for actuating the power-shaft.

6. A bucket comprising a plurality of sections, a power-shaft connecting the same, a plurality of drums of relatively different size fast on said power-shaft, a rope for operating each of said drums, and means connected to the sections and actuated from the power-shaft for actuating said sections.

7. A bucket comprising a plurality of sections, a shaft connecting said sections, a web for each of said sections, a segmental rack carried by said web, gears interposed between the power-shaft and the segmental racks for imparting motion from said shaft to said racks, and means including a plurality of lines for actuating the shaft.

8. A bucket comprising a plurality of sections having inwardly-extending arms or brackets, a power-shaft passing through said arms or brackets and connecting the sections, a plurality of ropes for turning said power-shaft in opposite directions, a rack member for each section, means for supporting said rack member, and a train of gearing interposed between the power-shaft and the rack members whereby motion is imparted from said shaft to the racks to swing said sections on the power-shaft as a pivot.

9. A bucket comprising a plurality of sections, a power-shaft connecting said sections and about which said sections are adapted to move, a plurality of ropes for actuating the power-shaft, guides for said ropes, and mechanism interposed between the power-shaft and the bucket-sections for actuating the latter.

10. The combination of an engine having a plurality of drums, a line connected to each of said drums at one end, a bucket formed of sections pivoted to a power-shaft, the other ends of the lines being connected to said shaft to actuate the latter, and rack-and-pinion members actuated from the power-shaft by movement of the lines when the engine-drums are operated, to raise and lower and actuate the bucket-sections.

In testimony whereof I have signed my name to this specification in the presence of two subscribing witnesses.

CHARLES A. MORRIS.

Witnesses:
R. B. CAVANAGH.
JOHN A. WEBSTER.